Feb. 24, 1948. R. P. ANDERSON 2,436,413
CONTROLLER FOR ALTERNATING CURRENT MOTORS
Filed April 8, 1943 2 Sheets-Sheet 1
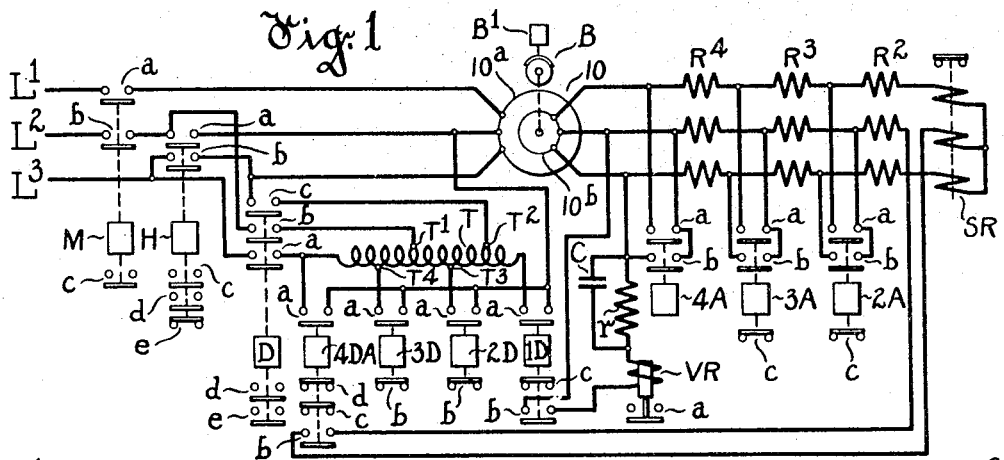
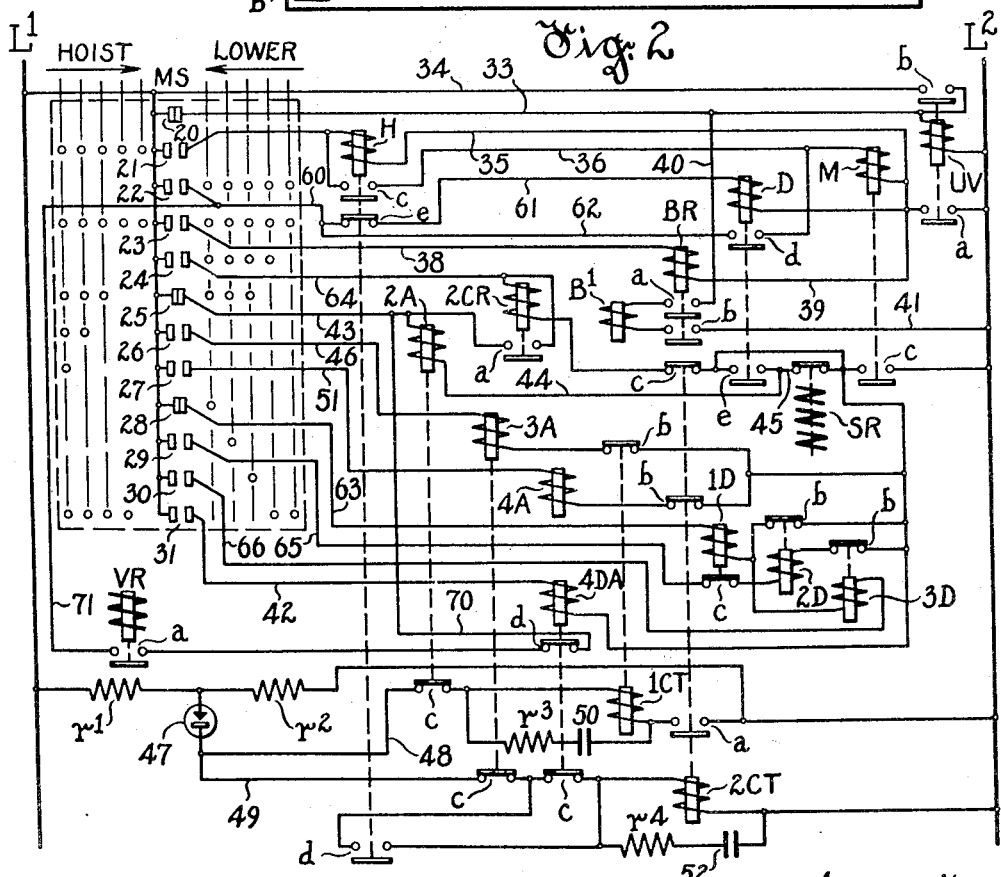
Inventor
Ralph P. Anderson Feb. 24, 1948.   R. P. ANDERSON   2,436,413
CONTROLLER FOR ALTERNATING CURRENT MOTORS
Filed April 8, 1943   2 Sheets-Sheet 2
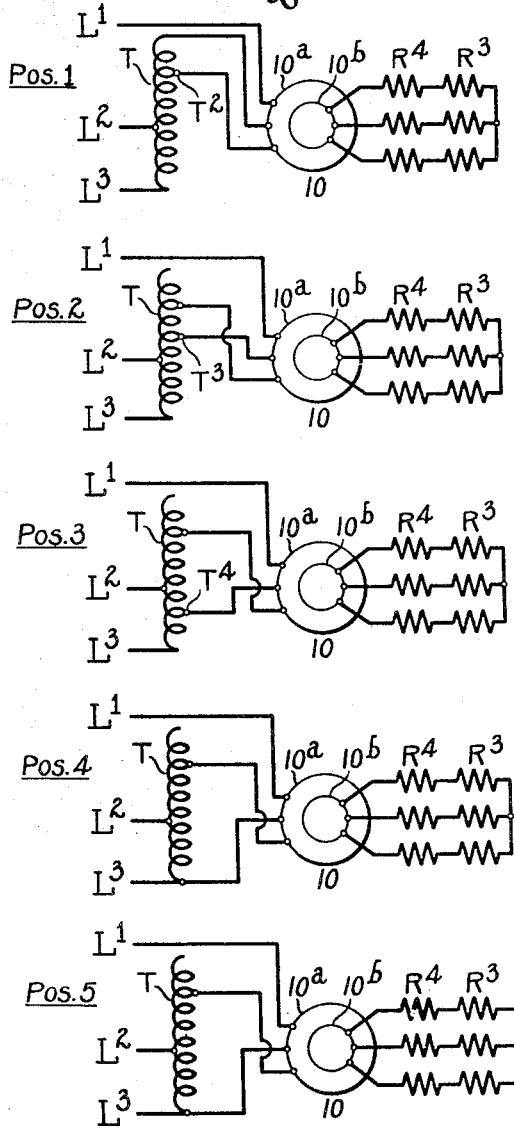
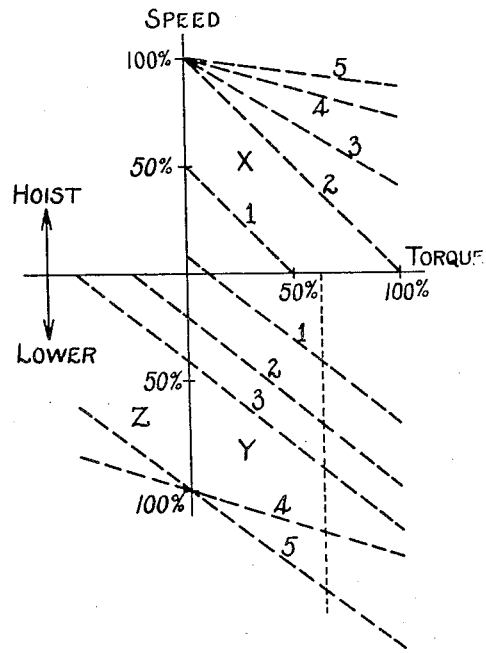

Patented Feb. 24, 1948

2,436,413

UNITED STATES PATENT OFFICE 2,436,413

CONTROLLER FOR ALTERNATING-CURRENT MOTORS

Ralph P. Anderson, Cleveland, Ohio, assignor to Cutler-Hammer, Inc., Milwaukee, Wis., a corporation of Delaware Application April 8, 1943, Serial No. 482,273

25 Claims. (Cl. 172—152)

1

This invention relates to improvements in control of alternating current motors, and more particularly of such motors where employed for hoisting and lowering widely varying loads.

Satisfactory control of such motors for lowering of loads varying between a high overhauling value and a low nonoverhauling value has long been sought. While very satisfactory control of direct current motors similarly employed has been developed, comparable control for alternating current motors has been lacking, the controls proposed not affording a slow lowering speed comparable to that provided for in the case of direct current motors.

The present invention has among its objects to so control an alternating current motor as to provide a more satisfactory slow speed in lowering widely varying loads.

Another object is to afford control of an alternating current motor in lowering widely varying loads which will be comparable to that afforded a direct current motor in like service, both as regards slow speed and higher speeds in lowering.

Another object is to afford the desired control of an alternating current motor through the medium of relatively simple means and circuit commutations.

Various other objects and advantages of the invention will hereinafter appear.

One embodiment of the invention is illustrated in the accompanying drawings, and the same will now be described, it being understood that the embodiment illustrated is susceptible of various modifications without departing from the scope of the appended claims.

In the drawing,

Figure 1 shows diagrammatically a motor and the power connections therefor;

Fig. 2 shows the control means for the power controlling switches of Fig. 1;

Fig. 3 shows in simplified form the power connections established in the various lowering positions;

Fig. 4 shows characteristic curves, and

Fig. 5 is a chart showing the sequence operation of the switches shown in Fig. 1.

Referring to Fig. 1, the same shows a motor 10 having a primary $10^a$ and a secondary $10^b$, the former to be supplied with power from lines $L^1$, $L^2$, $L^3$ and the latter having sets of resistances $R^2$, $R^3$ and $R^4$. The motor 10 is shown as provided with an electromagnetically controlled brake B mechanically set and provided with releasing coil $B^1$.

2

Power connections for hoisting are afforded by a two-pole electroresponsive main switch M and a two-pole electroresponsive hoist switch H. The main switch M through the medium of its contacts $a$ alone controls the connection between one motor terminal and line $L^1$ and has its contacts $b$ included in circuit between another motor terminal and line $L^2$. The switch H has its contacts $a$ in series with the contacts $b$ of main switch M and has its contacts $b$ in circuit between a third motor terminal and line $L^3$. Control of the secondary circuit of the motor is afforded by electroresponsive switches 2A, 3A and 4A of the double pole type, which switches respectively short-circuit the sets of resistances $R^2$, $R^3$ and $R^4$. The secondary circuit of the motor also includes the windings of a series relay SR and normally disengaged contacts $b$ of an electroresponsive switch 4DA, these contacts being included in one phase of the secondary between resistance $R^2$ and a winding of the series relay SR for purposes hereinafter set forth.

Power connections for lowering are afforded by the main switch M and a 3 pole electroresponsive lowering switch D, these power connections including an autotransformer T. This autotransformer provides for unbalancing of the motor primary in lowering and switch D through its contacts $a$ connects the left hand terminal of the autotransformer to line $L^3$ and through its contacts $b$ connects tap $T^1$ of the autotransformer to line $L^2$ through contacts $b$ of main switch M. Further the switch D through its contacts $c$ connects tap $T^2$ of the autotransformer directly to one terminal of the motor primary. An electroresponsive switch 1D affords a connection from the right hand terminal of the autotransformer to a second terminal of the motor primary and switches 2D and 3D serve to successively shift the connection of such motor terminal to taps $T^3$ and $T^4$, respectively, of the autotransformer. Switch 4DA heretofore referred to, establishes through its contacts $a$ a direct connection between the last mentioned terminal of the motor primary to line $L^3$, through the contacts $a$ of switch D. In lowering, the switch D and the main switch M are under the control of a voltage relay VR biased to disengage its contacts $a$. This voltage relay has its winding connected across one phase of the motor secondary through normally disengaged contacts $b$ of switch 1D and through a condenser C having a shunt resistor $r$.

The electroresponsive switches of Fig. 1 hereinbefore referred to have in addition to their main contacts auxiliary contacts which are utilized in the control connections shown in Fig. 2. Thus main switch M has auxiliary contacts $c$, and the hoisting switch H has auxiliary contacts $c$, $d$ and $e$, whereas the lowering switch D has auxiliary contacts $d$ and $e$. Each of the accelerating switches 2A and 3A has in addition to its main contacts $a$ and $b$ auxiliary contacts $c$ and each of switches 2D and 3D has in addition to its main contacts $a$ auxiliary contacts $b$. The switch 4DA has in addition to its main contacts $a$ and the aforementioned contacts $b$ auxiliary contacts $c$ and $d$. Certain of these auxiliary contacts are of the normally engaged type, while others are of the normally disengaged type, for reasons which will later appear.

Considering the functions of the control prior to describing the same in further detail, hoisting operation is initiated by energizing switches H and M to connect the motor primary to the supply lines, at the same time energizing the brake coil $B^1$ to release the brake. Upon initiation of hoisting the accelerating switches 2A, 3A and 4A are open, whereas one phase of the motor secondary is interrupted by the contacts $b$ of the switch 4DA now deenergized. This affords low torque connections for slack cable take-up. Then assuming desire for normal hoisting operation, the switch 4DA is energized to complete the previously interrupted phase of the motor secondary after which the switches 2A, 3A and 4A are energized successively to exclude the resistances $R^2$, $R^3$ and $R^4$, respectively, for progressively increasing hoisting speeds. The series relay SR functions to delay response of the switch 2A while abnormal conditions exist in the secondary circuit of the motor, and switch 3A is dependent for response upon prior response of switch 2A, while switch 4A is dependent for response upon prior response of switch 3A. In practice it is usually desired to insure a time element incident to response of each of switches 3A and 4A, and the control of Fig. 2 affords such time element, as will later be described.

Such hoisting control affords five steps having the speed torque characteristics depicted in quadrant X of Fig. 4. The desirability of such speed torque characteristics in hoisting and the possibility of obtaining the same through control of the character set forth is of course well known.

The control means of Fig. 1 also affords the five steps in lowering depicted in Fig. 3, the brake winding BR of course being energized upon initiation of lowering. Referring to the first diagram of Fig. 3, it will be observed that the autotransformer T has one section connected across lines $L^2$ and $L^3$ and that two terminals of the motor primary are connected respectively to the terminal and the tap $T^2$ of the other section of the autotransformer, the third motor terminal being connected directly to line $L^1$, while the secondary of the motor includes resistances $R^4$ and $R^3$. This affords unbalance of the primary of the motor, and the motor will then function with the speed torque characteristic depicted by curve 1 in quadrant Y of Fig. 4. Thus it will be seen that with full load on the hook the load can be lowered at about 40% of synchronous speed of the motor. It will also be observed that while with an empty hook the motor would tend to hoist, its torque would be too low even to overhaul the gearing, and hence danger of hoisting with an empty hook may be neglected.

Again referring to Fig. 3, it will be observed that in position 2 the connections of the outer terminals of the motor primary remain the same, whereas the connection for the middle terminal has been shifted to tap $T^3$ of the autotransformer, effecting reversal in torque of the motor with speed torque characteristics, depicted by curve 2 in quadrants Y and Z of Fig. 4. This change at full load on the hook affords a lowering speed of about 70% of synchronous speed and affords also a kick-off for an empty hook, the torque at zero speed being about 25%.

Again referring to Fig. 3, it will be noted that in position 3 the connection of the center terminal of the motor primary has been shifted to tap $T^4$ of the autotransformer for a lesser degree of unbalance, with a consequent change in speed torque characteristic, such change being depicted by curve 3 of quadrants Y and Z of Fig. 4. Here it will be noted that with full load on the hook lowering may be effected at almost synchronous speed, whereas the torque and speed for lowering an empty hook are also increased.

Again referring to Fig. 3, it will be observed that in position 4 the connection for the center terminal of the motor primary is changed for direct connection of said terminal to line $L^3$ for close approach to balance of the motor primary with a further change in speed torque characteristic, such change being depicted by curve 4 of quadrants Y and Z of Fig. 4, whereas in position 5 resistance $R^2$ is included in the motor secondary circuit to further change the speed torque characteristic as depicted by curve 5. Curves 4 and 5, it will be noted, provide for two points of super-synchronous speed control for overhauling loads.

Such control thus affords lowering control quite comparable to that heretofore readily obtained in direct current systems and which has long been desired in A. C. systems. It will also be observed that the five steps of lowering control are obtained with unvarying connections for two terminals of the motor. Moreover as will later appear, the relay VR affords means for maintaining the main switch M and the switch D energized following lowering operation until the motor comes to a standstill, thus causing the motor to afford dynamic braking, supplementing the braking action of the brake B when released incidental to stopping. It appearing that the effects of unbalancing the primary which effects are here utilized for better lowering control are in general well understood, detailed discussion thereof herein is deemed unnecessary.

Referring now to the control as shown in Fig. 2, this figure shows diagrammatically all of the switches of Fig. 1, but omits the main contacts thereof used for controlling power connections. Additionally it shows the brake coil $B^1$, a brake relay BR controlling coil $B^1$, a low voltage relay UV, a relay 2CR controlling a circuit for accelerating switch 2A and timing relays 1CT and 2CT for the accelerating switches 3A and 4A, respectively. The timing relays are shown as provided with condenser timing means hereinafter described. Also Fig. 2 shows a master switch MS for controlling the aforementioned switches and relays, this master switch being shown as of a conventional drum type.

The master switch as shown comprises a plurality of pairs of cooperating contacts 20 to 31 and in the off position the contacts 20, 25 and 28 are in engagement while all remaining contacts are disengaged. When the master switch is operated in either hoisting or lowering direction the several pairs of contacts are disengaged except as engagement thereof is indicated by the dots or circles in horizontal alignment with the contacts, each dot or circle indicating engagement for a given position of the master switch. Thus for example normally disengaged contacts 21 are engaged in all hoisting positions, whereas normally engaged contacts 25 are engaged in the last three hoisting positions and the first three lowering positions being disengaged in all other positions of the master switch.

With the master switch in off position and with normal voltage circuit may be traced from line $L^1$, through master switch contacts 20, by conductor 33 to and through the winding of low voltage relay UV to line $L^2$. This energizes said relay to engage its contacts $a$ to establish a circuit upon which other switches are dependent when the master switch is moved to an operative position. Also relay UV in responding completes through conductor 34 and its contacts $b$ a maintaining circuit for itself in parallel with the contacts 20 of the master switch whereby said relay remains energized when the master switch is moved to any of its operative positions, assuming continued normal voltage.

When the master switch is moved to its first hoisting position it engages contacts 21 to complete circuit from line $L^1$, through said contacts, to and through the winding of switch H, by conductor 35 to and through contacts $a$ of relay UV to line $L^2$. Switch H thus responds and through its contacts $c$ it completes a circuit for the winding of main switch M. This circuit may be traced from the master switch contacts 21 to and through contacts $c$ of switch H by conductor 36 to and through the winding of main switch M, to and through the contacts $a$ of relay UV to line $L^2$. Switch M thereupon responds and jointly with switch H connects the motor primary to the line for hoisting operation, the brake B meanwhile having been released in response to initial movement of the master switch. More specifically the master switch when moved to its first position also engages contacts 23 to complete circuit from line $L^1$, through said contacts, by conductor 38 to and through the winding of brake relay BR, by conductor 39, to and through the contacts $a$ of relay UV to line $L^2$, causing said brake relay to respond to energize the coil $B^1$ of brake B. The circuit of brake coil $B^1$ is traceable from line $L^1$ by conductors 33 and 40 through contacts $a$ of relay BR to and through the brake coil, and thence through contacts $b$ of relay BR, by conductor 41 to line $L^2$. These are the only circuit commutations effected in the first hoisting position, and as previously set forth they provide for starting of the motor with all resistance of the secondary circuit included but with one phase of the secondary circuit interrupted by the contacts $b$ of switch 4DA for reduced torque for slack cable torque takeup.

When the master switch is moved to its second hoisting position it engages its contacts 31, completing circuit from line $L^1$ through said contacts, by conductor 42 to and through the winding of switch 4DA and the contacts $c$ of main switch M to line $L^2$. This causes switch 4DA to respond to close the gap in the previously interrupted phase of the motor secondary circuit for increased motor torque.

When the master switch is moved to its third hoisting position it effects engagement of its contacts 25 to effect energization of accelerating switch 2A subject, however, to control by the series relay SR. More specifically, contacts 25 complete circuit from line $L^1$, by conductor 43, through the winding of switch 2A, by conductors 44 and 45, through the contacts of relay SR and the contacts $c$ of main switch M to line $L^2$. Response of switch 2A, as will be apparent from Fig. 1, excludes from the motor secondary circuit the resistances $R^2$.

When the master switch is moved to its fourth hoisting position it engages its contacts 26 and tends to effect energization of accelerating switch 3A. More specifically it completes circuit from line $L^1$, through contacts 26, by conductor 46, through the winding of switch 3A, to and through the contacts $b$ of relay 1CT and the contacts $c$ of main switch M to line $L^2$. However, if the master switch is moved quickly through its third hoisting position to its fourth hoisting position the contacts $b$ of relay 1CT will be disengaged because of energization of said relay, thus preventing immediate response of switch 3A. Such energization of relay 1CT results from the fact that its winding is normally connected across lines $L^1$ and $L^2$ through a potentiometer type connection comprising resistances $r^1$ and $r^2$ and through a rectifier 47. The resistances $r^1$ and $r^2$, as will be apparent, are connected directly across lines $L^1$ and $L^2$ in series, while the rectifier 47 is connected to line $L^1$ through resistance $r^1$ to supply rectified current to the winding of relay 1CT and also the winding of relay 2CT. More specifically, circuit extends from the rectifier 47, by conductor 48 through the down contacts $c$ of switch 2A and thence to and through the winding of relay 1CT and contacts $a$ of relay 2CT to line $L^2$. While the contacts $a$ of relay 2CT tend to disengage they are now engaged because relay 2CT is energized by a circuit traceable from the rectifier 47 by conductor 49, to and through the contacts $c$ of switch 3A and alternatively through contacts $c$ of switch 4DA or contacts $d$ of switch H, to and through the winding of relay 2CT to line $L^2$. Thus relay 2CT completes the energizing circuit of relay 1CT during the initial stages of acceleration and until switch 2A responds to disengage its contacts $c$. This tends to deenergize relay 1CT but its winding is connected in a closed loop including a normally charged condenser 50 and a resistance $r^3$ whereby release of relay 1CT is delayed, thus delaying response of switch 3A through maintaining contacts $b$ of relay 1CT disengaged. However, when relay 1CT releases subject to its time element its contacts $b$ complete the energizing circuit of switch 3A, causing it to respond to exclude from the motor secondary circuit the resistances $R^3$ for an additional step of acceleration.

When the master switch is moved to its fifth hoisting position it engages its contacts 27, tending to energize switch 4A. Contacts 27 complete circuit from line $L^1$, by conductor 51, through the winding of switch 4A, to and through contacts $b$ of relay 2CT, to and through the contacts $c$ of main switch M to line $L^2$. However, assuming the master switch to be moved quickly through its fourth hoisting position to its fifth hoisting position the relay 2CT will be energized, preventing immediate response of switch 4A. The energizing circuit for the winding of relay 2CT remains completed until switch 3A responds to disengage its contacts $c$ in circuit with the winding of said relay, whereupon release of said relay is further delayed for a temporary period. The winding of relay 2CT is connected in a closed loop including a condenser 52 and a resistor $r^4$, and hence like relay 1CT has a predetermined time element incident to its release. However, when relay 2CT releases its contacts b complete the energizing circuit of switch 4A, causing said switch to respond to exclude the motor secondary resistances R⁴ for another step of acceleration.

When the master switch is moved to its first lowering position it engages its contacts 22 to complete circuit from line L¹, through said contacts, by conductor 60, through down contacts e of the hoist switch H, by conductor 61 through the winding of lowering switch D, to and through the contacts a of relay UV to line L². The lowering switch D thus responds and through engagement of its contacts d completes a circuit for the winding of the main switch M. This circuit extends from conductor 60, by conductor 62, through contacts d of switch D, to conductor 36, and thence through the winding of switch M and the contacts a of relay UV to line L². Also the master switch in its first lowering position completes the heretofore described circuit of the brake relay BR to cause said relay to energize the brake coil B¹. Additionally the master switch in its first lowering position establishes an energizing circuit for the switch 1D, this circuit extending from line L¹ through master switch contacts 28, by conductor 63, to and through the winding of switch 1D and the down contacts b of switch 2D, and thence through contacts c of main switch M to line L². Thus in the first lowering position of the master switch the switches M, D and 1D respond to establish the primary connections inclusive of the autotransformer as shown in the first diagram of Fig. 3. Additionally the master switch in its first lowering position engages its contacts 26 to establish an energizing circuit for the winding of switch 2A, this circuit being as previously traced except for shunting of the contacts of series relay SR by contacts e of switch D. Thus the master switch in its first lowering position also provides for the motor secondary connections shown in the first diagram of Fig. 3. Here it will be noted that the master switch maintains such energizing circuit for the switch 2A in its second and third lowering positions.

Here also it is to be noted that the master switch in its first lowering position as well as in its second, third and fourth lowering positions tends to energize relay 2CR which upon responding establishes an energizing circuit for switch 2A paralleling the contacts 26 of the master switch. More specifically the master switch in its first four lowering positions engages its contacts 24 to complete a circuit from line L¹, through said contacts, by conductor 64, through the winding of relay 2CR, to and through contacts c of relay 2CT and contacts c of main switch M to line L². When relay 2CR responds it completes circuit from conductor 64 through its contacts a to the winding of switch 2a.

When the master switch is moved to its second lowering position it engages its contacts 29 to complete circuit from line L¹, through said contacts, by conductor 65 through contacts c of switch 1D to and through the winding of switch 2D, contacts b of switch 3D and contacts c of main switch M to line L². It thus causes switch 2D to respond to commutate the primary connections of the motor as shown in the second diagram of Fig. 3, the secondary connections of the motor remaining unchanged.

When the master switch is moved to its third lowering position it engages its contacts 30 to complete circuit from line L¹, through said contacts, by conductor 66, to and through the winding of switch 3D, contacts b of switch 2D, and contacts c of main switch M to line L². It thus causes switch 3D to respond to further change the primary connections of the motor as shown in the third diagram of Fig. 3, leaving the secondary connections unaltered.

When the master switch is moved to its fourth lowering position it engages its contacts 31 to complete circuit from line L¹, by conductor 42, through the winding of switch 4DA, and contacts c of switch M to line L², thus causing said switch to respond to establish the motor primary connections shown in the fourth diagram of Fig. 3, leaving unchanged the secondary connections.

When the master switch is moved to its fifth lowering position it maintain energized the switch 4DA and disengages its contacts 24 to deenergize relay 2CR, thus insuring deenergization of switch 2A to include in the motor secondary circuit the resistances R² as shown in the fifth diagram of Fig. 3.

Referring to the relay VR, the circuit of its winding, as previously set forth, is completed upon response of switch 1D and said relay upon responding engages its contacts a. These contacts of relay VR together with normally closed contacts d of relay 4DA complete a circuit from contacts 25 of the master switch by conductors 43 and 70 through contacts d of relay 4DR and contacts a of relay VR by conductors 71 to conductor 61. This circuit provides for line connection of the winding of the lowering switch D and of the winding of the main switch M, in the off position of the master switch as well as the first three lowering positions of the master switch. Energization of the main switch M in turn provides for energization in the off position of the master switch as well as the first lowering position, of the switch 2A and relay 1D. Accordingly when following lowering operation with the master switch in fourth or fifth lowering positions, the master switch is returned to off position it deenergizes relay 4DA, causing said relay to engage its contacts d to cooperate with the contacts a of relay VR to energize switches D, M, 2A and 1D as aforedescribed, providing what might be termed "Dynamic braking connections" in the off position of the master switch to assist the mechanical brake in stopping the motor. The relay VR is designed and adjusted to release somewhat prior to attainment of zero speed by the motor, and as will be apparent its release effects deenergization of switches D, M, 2A and 1D.

What I claim as new and desire to secure by Letters Patent is:

1. The combination with an alternating current motor for lowering loads varying between an overhauling value and a non-overhauling value, of means for controlling said motor through control of its secondary circuit, and means to connect said motor to a supply source and to effect voltage unbalance of the primary of said motor, said two means affording means to be set for different predetermined actions of said motor in lowering according to the setting of said means thereby to provide different lowering speeds selectively, said motor for the slowest lowering speed being caused by said means to produce a torque opposing lowering of all loads but following a curve such as to insure against hoisting operation at minimum load.

2. The combination with an alternating current motor for lowering loads varying between overhauling and non-overhauling values, of means for controlling said motor through control of its secondary circuit, and means including an autotransformer to supply power to the primary of said motor and to effect voltage unbalance of the motor primary to cause said motor to produce torque opposing lowering of all loads when said two means have a given setting and to cause such opposing torque to follow a curve such as to insure against hoisting at minimum load.

3. The combination with an alternating current motor for lowering loads varying between overhauling and non-overhauling values, of control means for the primary of said motor including an autotransformer through the medium of which with a given setting of said means the motor primary voltage may be unbalanced for motor torque opposing lowering of all loads, such opposing torque following a curve insuring against hoisting at minimum load, and said means having another setting for selection of a different action of said motor for a higher lowering speed, the selection involving reversal of the torque of said motor.

4. The combination with an alternating current motor for lowering loads varying between overhauling and non-overhauling values, of means for controlling said motor through control of its secondary circuit, and means including an autotransformer to supply power to the primary of said motor and to effect voltage unbalance of the motor primary to cause said motor to produce torque opposing lowering of all loads when said two means have a given setting and to cause such opposing torque to follow a curve such as to insure against hoisting at minimum load, said two means providing for selection of a different action of said motor for a higher lowering speed, and such selection involving reversal of the torque of said motor.

5. The combination with a polyphase alternating current motor for lowering loads varying between an overhauling value and a non-overhauling value, of control means for the primary of said motor including an autotransformer through the medium of which the motor primary voltage may be unbalanced for opposing lowering of all loads, or alternatively may be unbalanced for reversal of the motor torque for a higher lowering speed.

6. The combination with a polyphase alternating current motor for lowering loads varying between an overhauling value and a non-overhauling value, of control means for the primary of said motor including an autotransformer through the medium of which the motor primary voltage may be unbalanced for opposing lowering of all loads, or alternatively may be unbalanced for reversl of the motor torque for a higher lowering speed, the connections between said motor and said autotransformer remaining the same save for change in the autotransformer connection of one terminal of said motor.

7. The combination with a polyphase alternating current motor for lowering loads varying between an overhauling value and a non-overhauling value, of control means for the primary of said motor including an autotransformer through the medium of which the motor primary voltage may be unbalanced for motor torque opposing lowering of all loads, or alternatively may be unbalanced for reversal of the motor torque for a higher lowering speed, said means providing for direct line connection of one terminal of the motor, for a non-varying connection between a second terminal of the motor and said autotransformer and for an adjustable connection between a third terminal of said motor and said autotransformer.

8. The combination with a polyphase motor, a polyphase supply circuit therefor, an autotransformer and means to connect said autotransformer in part between two wires of said supply circuit, leaving a portion of said autotransformer outside of the supply circuit, to connect another wire of said circuit to a terminal of said motor, to connect a second terminal of said motor to a tap on the last mentioned portion of said autotransformer and to connect a third terminal of said motor selectively to different taps of said autotransformer, to provide alternatively for a motor torque to oppose lowering of either an overhauling or a non-overhauling load or for a reverse motor torque to control lowering of the load at a higher speed.

9. In an alternating current motor braking system, the combination with an alternating current motor, of an alternating current supply circuit, an auto-transformer, and means to interconnect the motor primary, said auto-transformer and said supply circuit for unbalance of said motor primary with a resultant motor torque at zero speed, for a given braking action, said means affording shifting of certain of the interconnections between said motor primary and said auto-transformer to modify the unbalance of said motor primary with a resultant reversal of zero speed torque, for a different braking action.

10. In an alternating current motor braking system, the combination with an alternating current motor, of an alternating current supply circuit, an auto-transformer, and means to interconnect the motor primary, said auto-transformer and said supply circuit for unbalance of said motor primary with a resultant motor torque at zero speed, for a given braking action, said means affording shifting of certain of the interconnections between said motor primary and said auto-transformer to modify the unbalance of said motor primary with a resultant reversal of zero speed torque, for a different braking action, said auto-transformer having a section to be connected between two lines of said supply circuit and a section extending from the former section for connection to certain of the terminals of said motor.

11. In an alternating current motor braking system, the combination with an alternating current motor, of an alternating current supply source therefor, unbalancing means for the motor primary circuit, and means to establish interconnections between the motor primary, said unbalancing means and said supply source for unbalance of said motor primary with a resultant motor torque at zero speed, for a given braking action, the second mentioned means affording change of said interconnections to modify the unbalance of said motor primary with a resultant reversal of zero speed torque, for a different braking action.

12. A hoist control system comprising a three-phase alternating current motor, three-phase current supply means therefor, voltage-biasing control means disposed between said supply means and said motor so as to permit varying two of the phase voltages of said motor while maintaining the third substantially constant in order to thereby unbalance the voltage distribution, and selective master control means connected with said voltage control means for setting them for different unbalance conditions of the multiphase voltage across said motor in order to operate said motor at stable subsynchronous speeds.

13. The combination with an alternating current motor for lowering loads varying between a high overhauling value and a low non-overhauling value, of means for controlling said motor through control of its secondary circuit, and means to connect said motor to a supply source and to effect voltage unbalance of the primary of said motor, said two means affording means to be set to cause said motor to produce a torque opposing descent of all loads with a tendency to hoist a minimum load, but said means when so set limiting the motor torque at minimum load to a value insuring against actual hoisting.

14. The combination with an alternating current motor for lowering loads varying between an overhauling value and a non-overhauling value, of control means for the primary of said motor affording connecting of said motor to a supply source and to effect voltage unbalancing of the primary of said motor, said means having different settings for different predetermined actions of said motor in lowering according to the setting of said means, thereby to provide different lowering speeds selectively, said motor for the slowest lowering speed being caused by said means to produce a torque opposing lowering of all loads but following a curve such as to insure against hoisting operation at minimum load.

15. A hoist control system comprising a wound rotor motor having primary terminals and a secondary resistance circuit, three-phase current supply means having three respective leads of which one is permanently in direct connection with one of said terminals, voltage biasing inductance means interposed between said two other leads and said respective two terminals and operable to unbalance the voltage distribution between said terminals in a degree sufficient to reverse the phase voltage sequence at said primary terminals, an operator-actuated master controller connected with said secondary circuit and with said inductance means for causing the latter to unbalance the voltage across said terminals when said secondary circuit is in a given resistance condition.

16. A hoist control system comprising a wound rotor motor having primary terminals and a secondary resistance circuit, three-phase current supply means having three respective leads of which one is in fixed connection with one of said terminals, voltage biasing inductance means interposed between said two other leads and said respective two terminals and operable to unbalance the voltage distribution between said terminals, line contactors associated with said supply means, an operator-actuated master controller connected with said secondary circuit and said contactors and said inductance means for causing the latter to unbalance said voltage distribution only when said contactors and secondary circuit are set by said master controller for low speed lowering operation of said motor.

17. A motor control system comprising an induction motor having multiphase primary terminals, multiphase line terminals for connection to an alternating current source of substantially balanced voltage of given phase rotation, unbalanceable voltage adjusting means disposed between said line terminals and said motor terminals for unbalancing the voltage imposed on said motor terminals and having a range of adjustment which includes an adjustment for an unbalanced motor voltage of a phase rotation opposite to that of said source voltage, multiposition control means connected with said voltage adjusting means for varying the degree of unbalance of said motor voltage, said control means being adjustable to a position in which the reversal of phase rotation of said motor voltage occurs at a finite speed value of the motor in order to cause the motor to develop braking torque.

18. A motor control system comprising an induction motor having multiphase primary terminals, multiphase line terminals for connection to an alternating current source of substantially balanced voltage of given phase rotation, unbalanceable voltage adjusting means disposed between said line terminals and said motor terminals for unbalancing the voltage imposed on said motor terminals and having a range of adjustment which includes an adjustment for an unbalanced motor voltage of a phase rotation opposite to that of said source voltage, multi-position control means connected with said voltage adjusting means for varying the degree of unbalance of said motor voltage, said control means being adjustable to different selective positions in which the reversal of phase rotation of said motor voltage occurs at different speed values respectively of the motor in order to cause the motor to develop respectively different degrees of countertorque under overhauling load conditions.

19. A hoist control system comprising a wound rotor motor having primary multiphase terminals and a secondary resistance circuit, multiphase line terminals for connection to an alternating current source of substantially balanced voltage of given phase rotation, unbalanceable voltage adjusting means disposed between said line terminals and said motor terminals for unbalancing the voltage imposed on said motor terminals and having a range of adjustment which includes an adjustment for an unbalanced motor voltage of a phase rotation opposite to that of said source voltage, a multi-position master controller connected with said secondary circuit and with said voltage adjusting means to control the resistance of said secondary circuit and the setting of said voltage adjusting means in a given relation to each other, said controller having a position in which said voltage adjusting means are ineffective and another position in which said voltage adjusting means are effective to cause reversal of said phase rotation at a given speed value of said motor in order to obtain countertorque under overhauling load conditions of the motor.

20. A hoist control system comprising a wound rotor motor having primary multiphase terminals and a secondary resistance circuit, multiphase line terminals for connection to an alternating current source of substantially balanced voltage of given phase rotation, unbalanceable voltage adjusting means disposed between said line terminals and said motor terminals for unbalancing the voltage imposed on said motor terminals and having a range of adjustment which includes an adjustment for an unbalanced motor voltage of a phase rotation opposite to that of said source voltage, a multi-position master controller connected with said secondary circuit and with said voltage adjusting means to control the resistance of said secondary circuit and the setting of said voltage adjusting means in a given relation to each other, said controller having a position in which said voltage adjusting means are set for reversing said phase rotation at a finite speed value of said motor in order to cause said motor to develop braking torque.

21. A motor control system comprising a wound rotor induction motor having multiple-phase primary windings and a secondary resistance circuit, multiple-phase alternating current supply means connected to said primary windings, primary voltage control means interposed between said supply means and said motor for controlling the balance condition of the primary phase voltage impressed on said windings, secondary control means for controlling the resistance of said secondary circuit, and master control means having a multiple number of selective control positions and being connected with said primary control means and said secondary control means for changing the degree of primary voltage balance in a given sequential relation to each other.

22. A motor control system comprising a wound rotor motor having primary terminals and a secondary resistance circuit, multiphase current supply means connected with said terminals, voltage control means interposed between said supply means and said terminals for varying the balance condition of the primary motor voltage, and operator-actuable selective contact means connected with said secondary circuit and with said voltage control means for causing the latter to unbalance the voltage across said terminals when said secondary circuit is in at least one selected resistance condition and causing said voltage control means to maintain said voltage substantially balanced when said circuit is in another selected condition.

23. A hoist control system comprising a wound rotor motor having primary terminals and a secondary resistance circuit, multiphase current supply means connected with said terminals, reversing contactors associated with said supply means, unbalanceable voltage control means interposed between said supply means and said terminals, an operator-actuated master controller connected with said contactors and said secondary circuit and with said control means for causing the latter to unbalance the voltage across said terminals when said contactors and secondary circuit are set by said master controller for low speed lowering operation of said motor.

24. A motor control system comprising an alternating current multiphase motor, multiphase current supply means therefor, stepwise variable voltage control means disposed between said supply means and said motor for varying the voltage distribution of said motor over a stepped range including a substantially balanced and an unbalanced voltage distribution, and a multiple point operator-actuated master controller having sequential contact steps connected with said voltage control means for causing them to change said voltage distribution in order to change the speed torque characteristic of said motor in corresponding steps.

25. A hoist control system comprising, in combination, an alternating current hoist motor having standard connected primary windings, a multiphase circuit connected to said windings and containing variable circuit means for unbalancing the voltage of said windings by varying the voltage of at least one of them between two values corresponding to low speed high torque and low speed low torque characteristics respectively, and an operator actuable controller for stepwise varying said circuit means between said values through selective intermediate stages corresponding to speed torque characteristics intermediate the aforesaid characteristics.

RALPH P. ANDERSON.

REFERENCES CITED

The following references are of record in the file of this patent:

UNITED STATES PATENTS

| Number | Name | Date |
|---|---|---|
| 913,415 | Mershon | Feb. 23, 1909 |
| 1,269,625 | Lum | June 18, 1918 |
| 2,233,501 | Wilcox | Mar. 4, 1941 |